(12) United States Patent
Berger et al.

(10) Patent No.: US 7,810,883 B2
(45) Date of Patent: Oct. 12, 2010

(54) ADJUSTABLE CHILD RESTRAINT DEVICE

(75) Inventors: Russell Berger, Needham, MA (US); David Clement, Colorado Springs, CO (US)

(73) Assignee: SKJP Holdings, LLC, Naples, FL (US)

( * ) Notice: Subject to any disclaimer, the term of this patent is extended or adjusted under 35 U.S.C. 154(b) by 207 days.

(21) Appl. No.: 11/970,729

(22) Filed: Jan. 8, 2008

(65) Prior Publication Data
US 2008/0169692 A1 Jul. 17, 2008

Related U.S. Application Data

(60) Provisional application No. 60/885,227, filed on Jan. 17, 2007.

(51) Int. Cl.
*A47D 1/10* (2006.01)
(52) U.S. Cl. ............... 297/256.1; 297/284.3; 297/284.9
(58) Field of Classification Search .............. 297/250.1, 297/256.1, 284.3, 284.9
See application file for complete search history.

(56) References Cited

U.S. PATENT DOCUMENTS

| 4,324,431 | A | | 4/1982 | Murphy et al. |
| 4,500,136 | A | | 2/1985 | Murphy et al. |
| 4,854,639 | A | | 8/1989 | Burleigh et al. |
| 5,098,157 | A | | 3/1992 | Surot |
| 5,383,708 | A | | 1/1995 | Nagasaka et al. |
| 5,645,317 | A | * | 7/1997 | Onishi et al. ............. 297/250.1 |
| 5,681,084 | A | * | 10/1997 | Yoneda .................... 297/284.9 |
| 5,810,436 | A | | 9/1998 | Surot |
| 6,089,662 | A | | 7/2000 | Lambert et al. |
| 6,189,970 | B1 | | 2/2001 | Rosko |
| 6,227,616 | B1 | | 5/2001 | Branke et al. |
| 6,273,509 | B1 | | 8/2001 | Reithmeier et al. |
| 6,378,950 | B1 | | 4/2002 | Takamizu et al. |
| 6,478,377 | B2 | | 11/2002 | Kassai et al. |

(Continued)

FOREIGN PATENT DOCUMENTS

DE 19755526 C2 10/1999

(Continued)

OTHER PUBLICATIONS http://www.motherschoice.com.au/pages/carseats.php.

(Continued)

*Primary Examiner*—Sarah B McPartlin
(74) *Attorney, Agent, or Firm*—Barlow, Josephs & Holmes, Ltd.

(57) ABSTRACT

The present invention provides an adjustable child restraint device, namely, a juvenile safety seat. The safety seat preferably includes a backrest and a pair of side guards that protect the body and shoulder of a person, such as a small child. Each of the pair of side guards have a top end and a bottom end and each are respectively pivotally connected about an axis to the backrest at their bottom ends and movable between a closed position and an open position so that the distance between the respective bottom ends of the side guards remains substantially constant and the distance between the respective top ends of the side guards is adjustable by pivoting movement of the side guards. A curved guide means is disposed in communication with the side guards for guiding movement of the side guards.

12 Claims, 12 Drawing Sheets

U.S. PATENT DOCUMENTS

| | | |
|---|---|---|
| 6,491,348 B1 | 12/2002 | Kain |
| 6,601,917 B1 | 8/2003 | Christopherson |
| 6,616,229 B2 | 9/2003 | Kuster et al. |
| 6,623,074 B2 | 9/2003 | Asbach et al. |
| 6,659,564 B2 * | 12/2003 | Kassai et al. ............... 297/484 |
| 6,857,700 B2 | 2/2005 | Eastman et al. |
| 6,910,735 B2 | 6/2005 | Asbach et al. |
| 6,986,548 B2 | 1/2006 | Jane Santamaria |
| 7,055,903 B2 | 6/2006 | Balensiefer et al. |
| 7,131,695 B2 | 11/2006 | Hofschulte et al. |
| 7,140,681 B2 | 11/2006 | McMillen |
| 7,195,314 B2 | 3/2007 | Spence et al. |
| 7,232,185 B2 | 6/2007 | Hartenstine et al. |
| 2005/0189806 A1 | 9/2005 | Hall et al. |
| 2005/0200177 A1 | 9/2005 | Balensiefer |
| 2005/0212342 A1 | 9/2005 | Kain et al. |
| 2006/0214487 A1 | 9/2006 | Holdampf et al. |
| 2006/0261649 A1 | 11/2006 | Baldwin et al. |
| 2007/0120403 A1 | 5/2007 | Drexler |
| 2007/0228792 A1 * | 10/2007 | Chen et al. ............... 297/284.9 |
| 2007/0246982 A1 * | 10/2007 | Nett et al. ............... 297/250.1 |

FOREIGN PATENT DOCUMENTS

| | | |
|---|---|---|
| DE | 202005013453 U1 | 12/2005 |
| EP | 0287259 A2 | 10/1988 |
| EP | 1574387 B1 | 7/1998 |
| EP | 1152918 B1 | 12/1999 |
| EP | 1084900 A2 | 3/2001 |
| JP | 2001097087 A | 4/2001 |
| JP | 2002120614 | 4/2002 |
| WO | 2006039877 A3 | 4/2006 |

OTHER PUBLICATIONS

Takata-Petri AG, "Takata312-neo", www.takata-petri.com.
Recaro "Start Instruction Manual", Recaro North America, Inc., www.recaro-nao.com pp. 1-14.

* cited by examiner

ADJUSTABLE CHILD RESTRAINT DEVICE

CROSS-REFERENCE TO RELATED APPLICATIONS

This application claims priority from prior U.S. Provisional Application Ser. No. 60/885,227 filed on Jan. 17, 2007.

BACKGROUND OF THE INVENTION

The present invention relates generally to child restraint and safety devices. More specifically, the present invention relates to child restraint and safety devices, such as child car seats and booster seats.

In the prior art, child safety restraints, such as those for use in a vehicle are very well known in the art. Such restraints are secured to an existing vehicle car seat. The child is then secured to the restraint to secure the child during travel. These prior art restraints are typically in the form of a booster seat or a child car seat. A booster seat is commonly known as a seat that attached to an existing vehicle seat where the seat uses the existing belt restraint system of the vehicle. Such a booster seat is commonly used for older children. Also, a child restraint may be in the form of a child car seat which is secured itself directly to the vehicle, such as by the car's seat belt system or directly to the frame of the vehicle using hooks, and other attachment mechanisms and systems. These child car seats, in contrast to booster seats, are commonly used for younger children.

In the industry, a child restraint device, such as a booster seat or a child car seat, is typically purchased of a size and configuration that is appropriate for the given child. For example, for a younger child of 1 or 2 years old, a child car seat would be appropriate. Further, the size of the child seat can be selected to be more appropriate for the child and his size, weight and shape. Also, a booster seat would be more appropriate for a child over 4 years old who may be too big for a child car seat.

Thus, in the prior art, one of the two primary types of restraint devices (car seat or booster seat) must be selected to secure the child in a car. While these devices may be suitable and fit the child at the time of purchase, the child will soon outgrow the seat requiring the purchase of a new car seat or booster seat. This requires an entirely new purchase of another restraint device. For example, an 8 month old child would first need an infant seat. Then after a year or so would need a toddler size seat. In fact, many different sized seats are available to match the size of the child. Thus, the purchase of a new seat would be periodically required. The same would be true for a child's booster seat.

Therefore, there is a need for a child restraint device that is adjustable to accommodate the child at their current size, shape and weight. There is a need for a child restraint device that can be adjusted easily as the child grows to obviate the need to periodically buy a fixed size restraint device. There is a need for a juvenile safety seat to have sides that are more adjustable at the top than the bottom. There is a need for a juvenile safety seat to be easily adjustable, such as by one hand of the user.

SUMMARY OF THE INVENTION

The present invention preserves the advantages of prior art child restraint devices, such as child seats and booster seats. In addition, it provides new advantages not found in currently available devices and overcomes many disadvantages of such currently available devices.

The present invention provides an adjustable child restraint device, namely, a juvenile safety seat. The safety seat preferably includes a backrest and a pair of side guards that protect the body and shoulder of a person, such as a small child. Each of the pair of side guards have a top end and a bottom end and each are respectively pivotally connected about an axis to the backrest at their bottom ends and movable between a closed position and an open position so that the distance between the respective bottom ends of the side guards remains substantially constant and the distance between the respective top ends of the side guards is adjustable by pivoting movement of the side guards. A curved guide means is disposed in communication with the side guards for guiding movement of the side guards.

It is also preferred that the curved guide means is attached to at least one of the pair of side guards and also attached to the back rest. It is preferred that the curved guide means includes at least one hollow and elongated member, such as at least two hollow and elongated members of differing diameters from each other with a hollow and elongated member being slidably received into another hollow and elongated member.

Also, the curved guide means may be connected to a side guard and a hollow and elongated member is connected to the other side guard with the curved guide means being respectively slidably received in the hollow and elongated member. Still further, the curved guide means may be at least one curved support member respectively connected to a side guard and respectively received in at least one curved channel in the backrest. Moreover, the curved guide means may be at least one curved support member respectively connected to a side guard and respectively received in at least one curved channel in the other side guard.

While these are preferred configurations, other embodiments of the present invention are envisioned as will be discussed in detail below.

It is therefore an object of the present invention to provide a child restraint device that is adjustable to accommodate the child at their current size, shape and weight.

A further object of the present invention is to provide a child restraint device that can be adjusted easily as the child grows to obviate the need to periodically buy a fixed size restraint device.

Yet another object of the present invention is to provide a juvenile safety seat that includes sides that are more adjustable at the top than the bottom.

Another object of the present invention is to provide a juvenile safety seat that is easily adjustable, such as by one hand of the user.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

The present invention provides for a unique child restraint device 10 that is adjustable to accommodate the child over a long time period and associated child sizes, weights and shapes. Such an adjustable restraint device 10 allows for a single device to be used to secure the child over a longer period of time.

Figure 1:
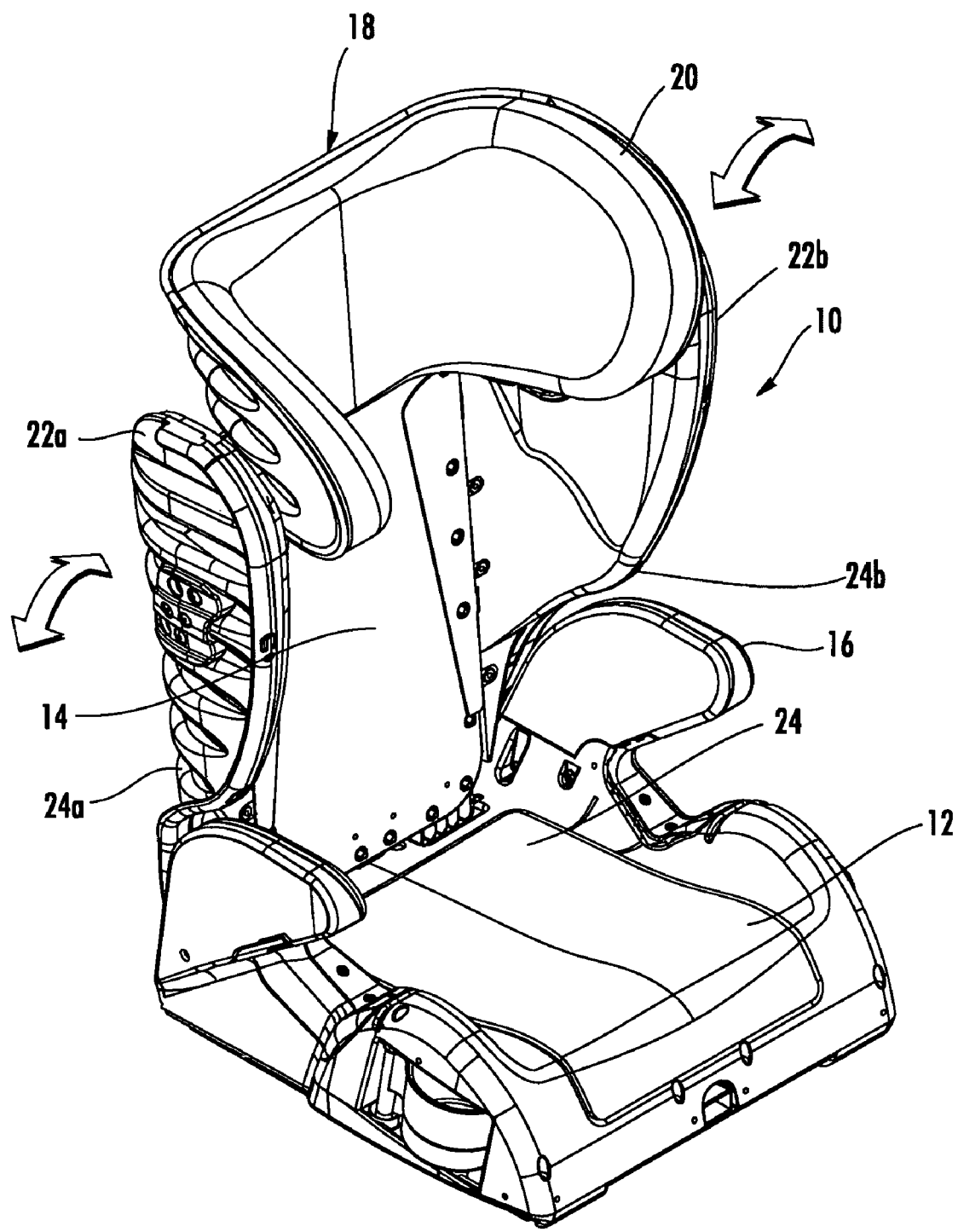
FIG. 1 is a front perspective view of the adjustable child restraint device of the present invention in a closed condition.
Figure 2:
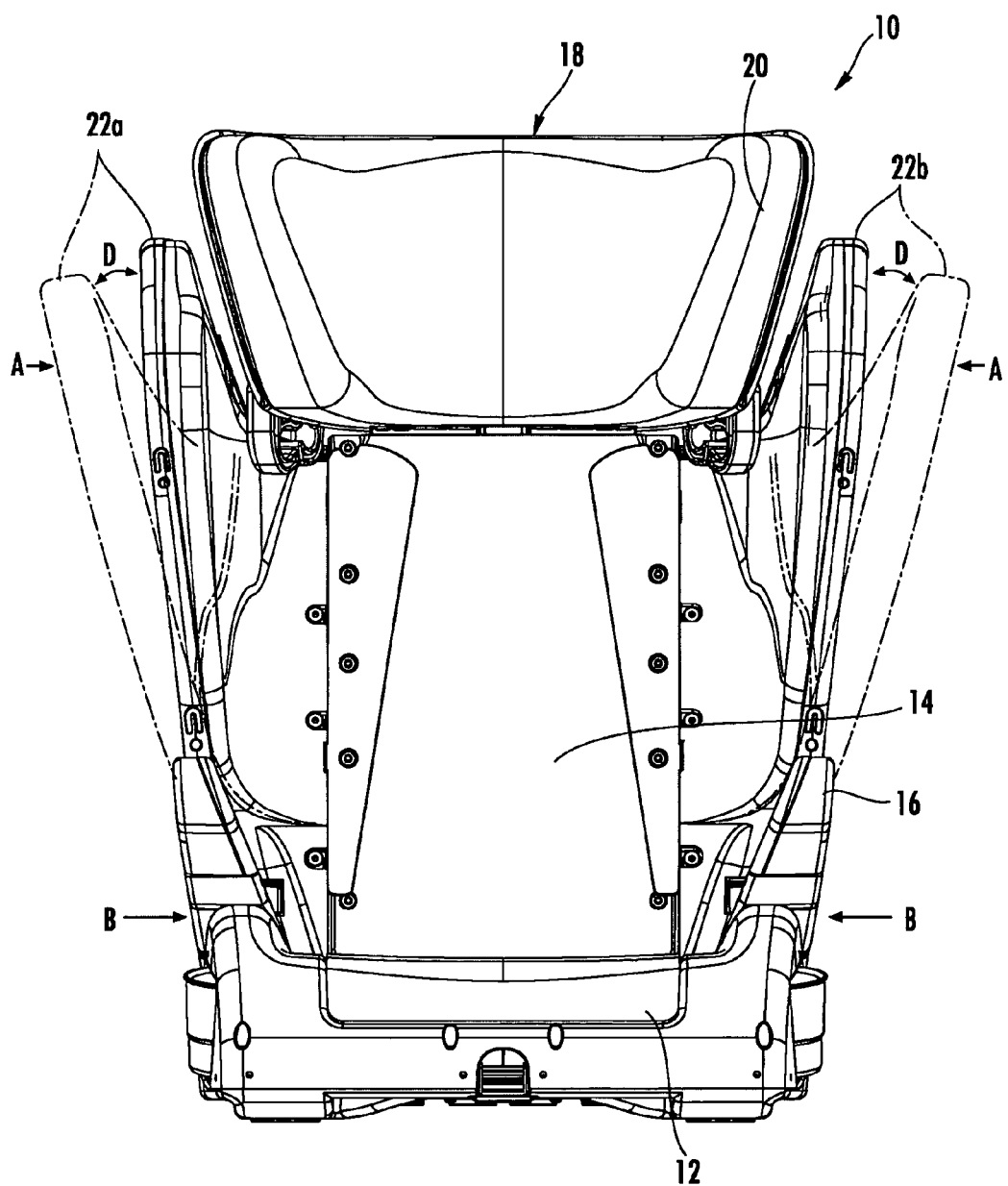
FIG. 2 is a front elevational view of the adjustable child restraint device of FIG. 1.

Referring first to FIGS. 1 and 2, a perspective view of the adjustable child restraint device 10 of the present invention, which is also known as a juvenile safety seat or safety booster seat. The juvenile safety seat construction 10 includes a seat bottom 12, a seat back 14 and optional armrests 16, although inclusion of armrests are preferred. Also, a head rest 18, preferably with side supports 20 are also included. The head rest 18 may be fixed to the seat back 14 or may be adjustably connected thereto.

Most importantly, the juvenile safety seat 10 of the present invention includes a pair of adjustable side guards 22a and 22b that pivot open to enlarge the distance therebetween to accommodate a child seated therein of different sizes, as mentioned above. As best shown in the broken lines of FIG. 2, the side guards 22a, 22b may pivot outwardly so that the distance A at the top of the seat 10 between the side guards 22a, 22b are the most adjustable while the distance B at the bottom of the seat 10 between the side guards 22a, 22b (and between the armrests) remains substantially fixed. Moreover, the radial movement of the side guards 22a, 22b, due to the pivoting configuration, is more controlled than a sliding movement because one point of each of the side guards 22a, 22b are fixed. Thus, the unique curved guide structure of the present invention permits more stability because the nature of the guiding structure is fixed to both of the side guard 22a, 22b components while still providing the needed support through a range of radial movement.

It is desirous for the top of the side guards 22a, 22b to expand as the child grows rather than the bottom of the seat 10 and the side guards 22a, 22b because it is the child's shoulders that grow most notably rather than the waist and thigh portions of the child. Therefore, adjustability of the seat 10, namely, in the side guards 22a, 22b is most effective when the top of the side guards 22a, 22b have the capability of expanding outwardly rather than the bottom of the seat 10. Also, a fixed lower portion 24 of the seat 10, at the armrests 16 and lower portion 24a, 24b of the side guards 22a, 22b helps stabilize the entire structure of the seat 10 for a more secure seating environment for the child.

Figure 8:
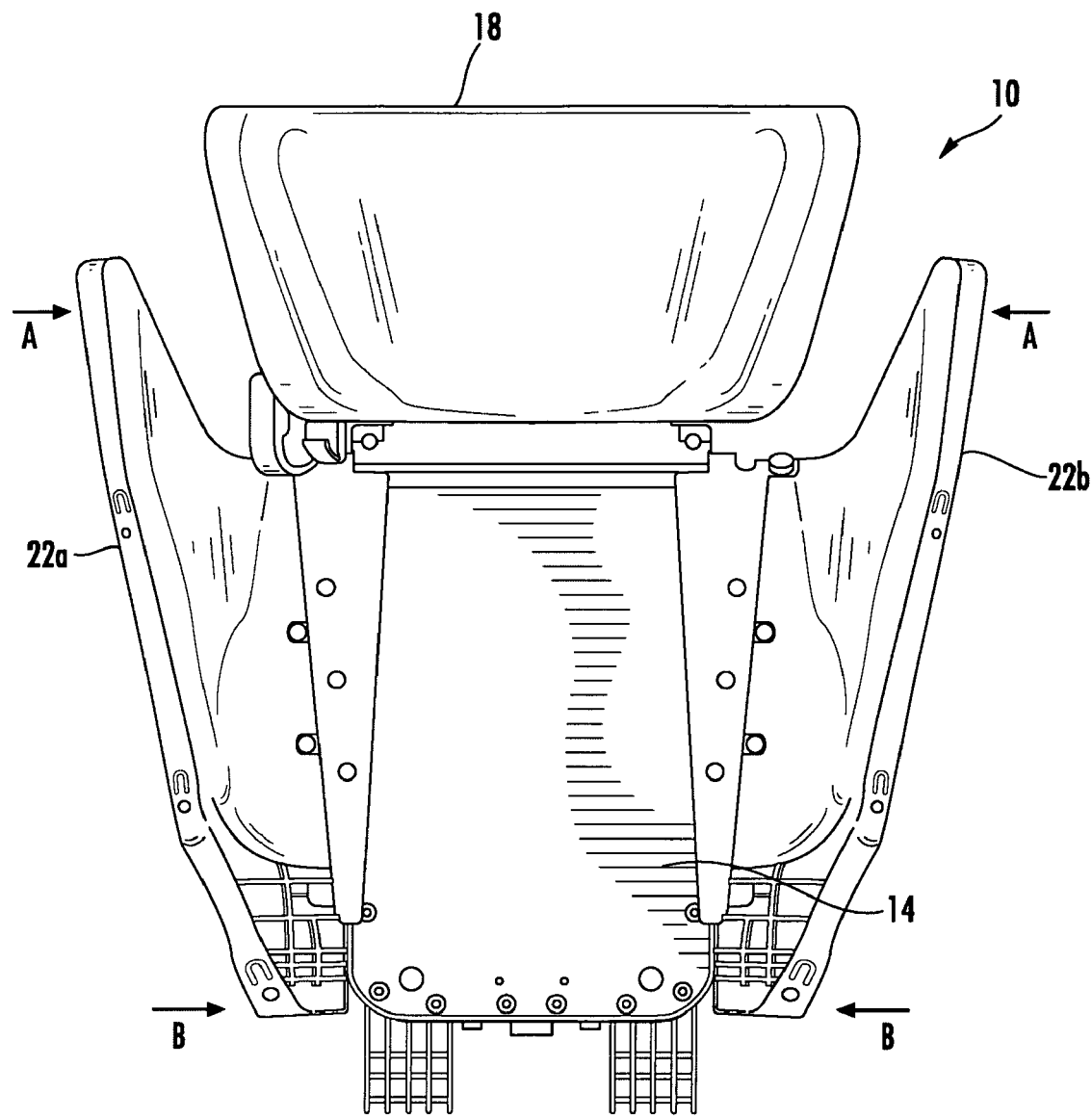
FIG. 8 is a front elevational view of the adjustable child restraint device of FIG. 1 in an open condition.
Figure 9:
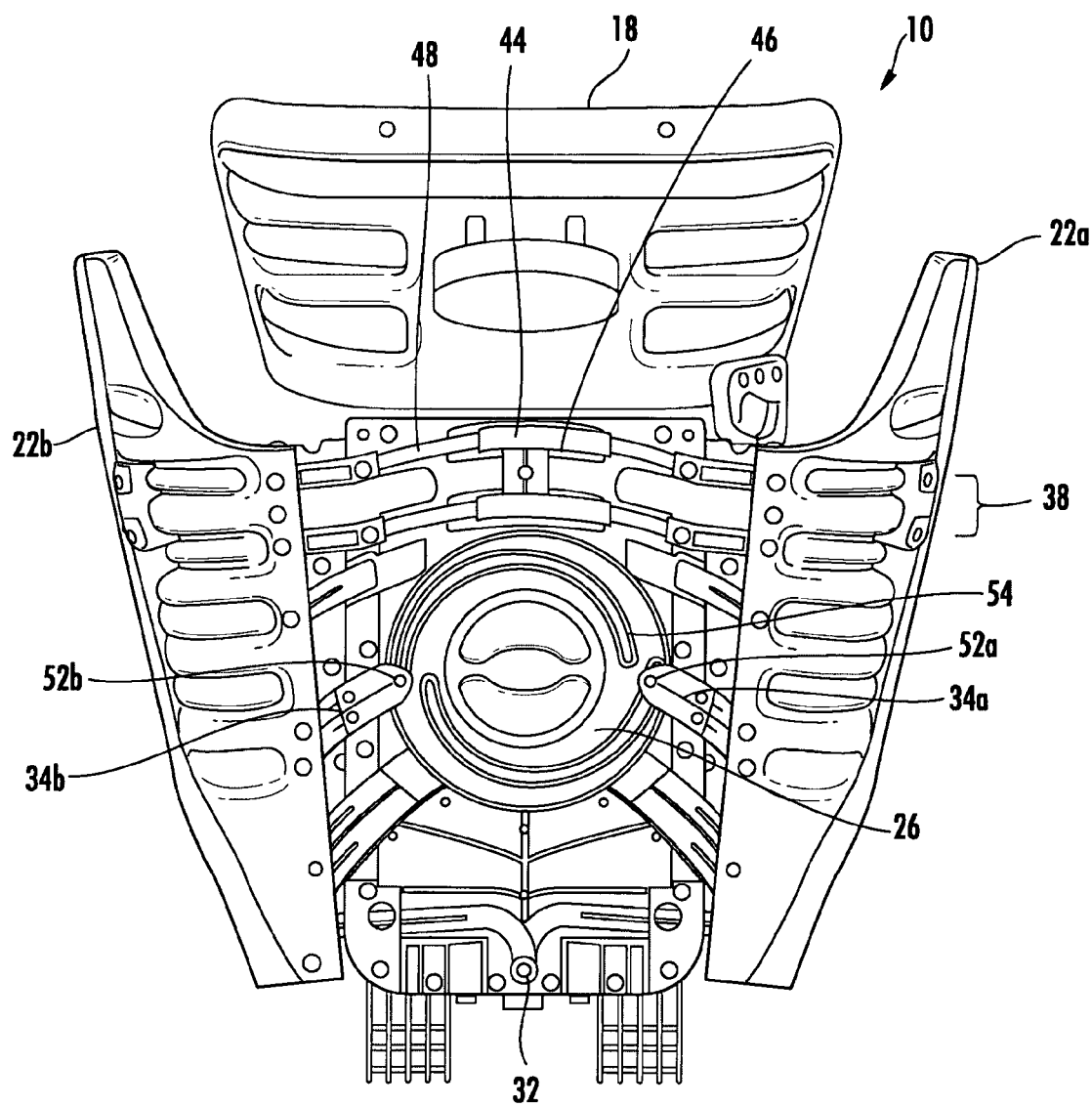
FIG. 9 is a rear elevational view of the adjustable child restraint device of FIG. 1 in an open condition.

More specifically, the side guards 22a, 22b in a closed condition to accommodate a smaller child while FIGS. 8-9 show the seat 10 of the present invention with side guards 22a, 22b in an open condition to accommodate a larger sized child. More specifically, the side guards 22a, 22b of the seat 10 move or actuate horizontally in order to adjust the lateral dimension of the seat to provide the child car seat 10 with more width/breadth to better fit a larger child. The restraint device seat 10 can be micro adjusted and set to positions between the closed and open conditions shown. Thus, the seat 10 can be adjusted gradually as the child grows.

The side guards 22a, 22b of the device be affixed to the main body of the child seat, such as to the backrest 14. Thus, the side guards 22a, 22b move outward to create more width and breadth at the top of the seat 10 than at a lower portion of the seat 10. Also, the horizontal movement of the side guards 22a, 22b of the seat 10 could also be a sliding motion whereby the entire sides of the seat (i.e. both top and the bottom of the sides) can move inward and outward in a horizontal fashion. The side guards 22a, 22b may be movably affixed in any way. For example, they can slide outwardly. Preferably, as will be described in detail below, the bottom ends of the side guards 22a, 22b can be pivotally connected to the main body of the device, such as the seat back 14, whereby the side guards 22a, 22b pivot outwardly to accommodate a larger child therebetween. Also, the side guards 22a, 22b may be linked to each other and/or to the headrest 18, as discussed below (not shown). Any structure and linkage arrangement may be employed to carry out this interconnection and actuating movement.

Figure 3:
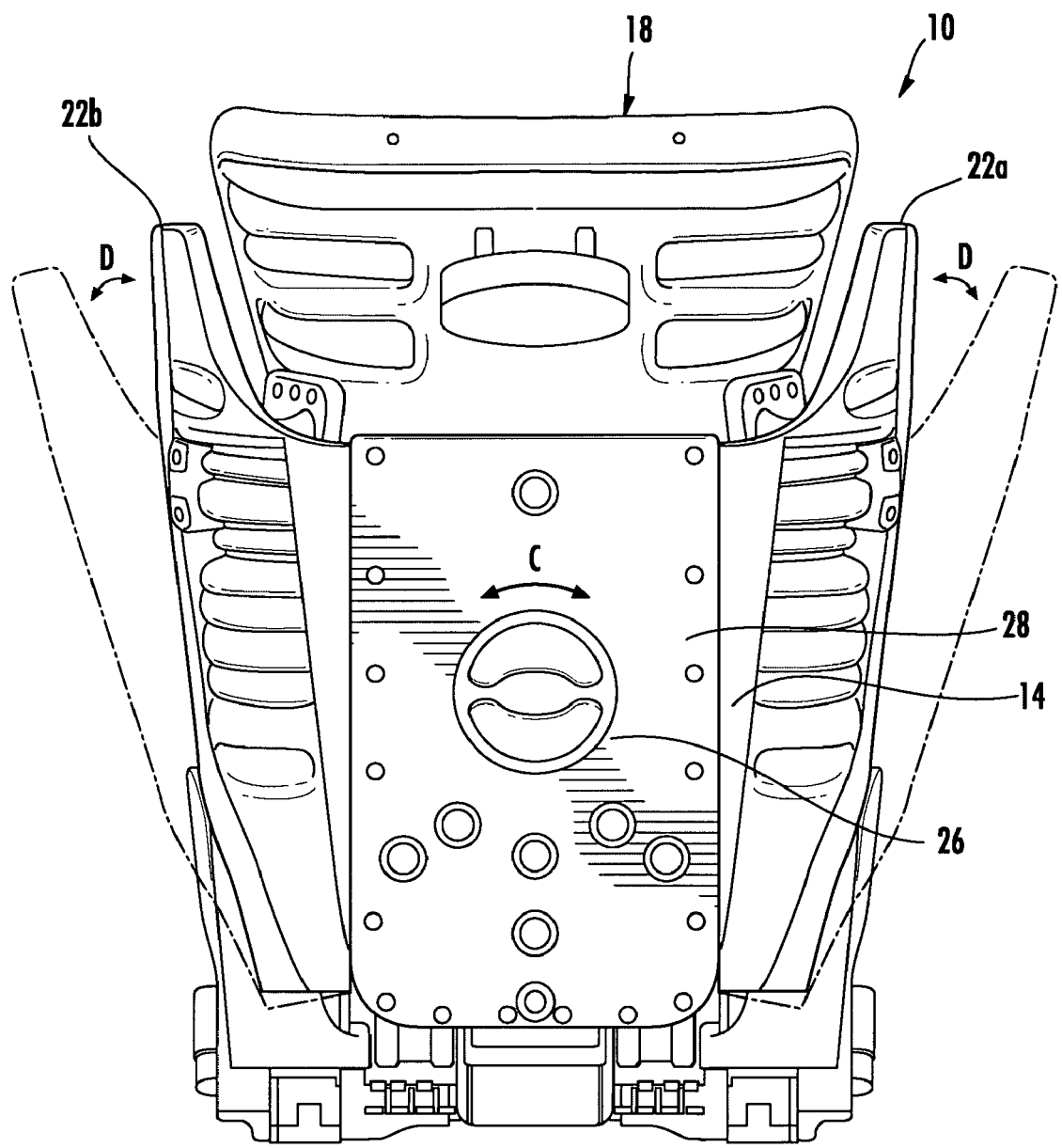
FIG. 3 is a rear elevational view of the adjustable child restraint device of FIG. 1.

Turning now to FIG. 3, further details of the unique construction of the safety seat 10 of the present invention is shown. The present invention provides a novel construction that enables the side guards 22a, 22b to be adjusted smoothly and in a simultaneous fashion. A single control knob 26 is preferably provided that can rotate as shown by reference arrow C in FIG. 3. The control knob 26 is mechanically linked to the side guards 22a, 22b using a unique linkage arrangement, as will be shown and described in detail in connection with FIGS. 4-7. A back plate 28 is secured to the back of the seat back 14 to aesthetically hide the linkage arrangement and to prevent injury from access thereto.

Figure 4:
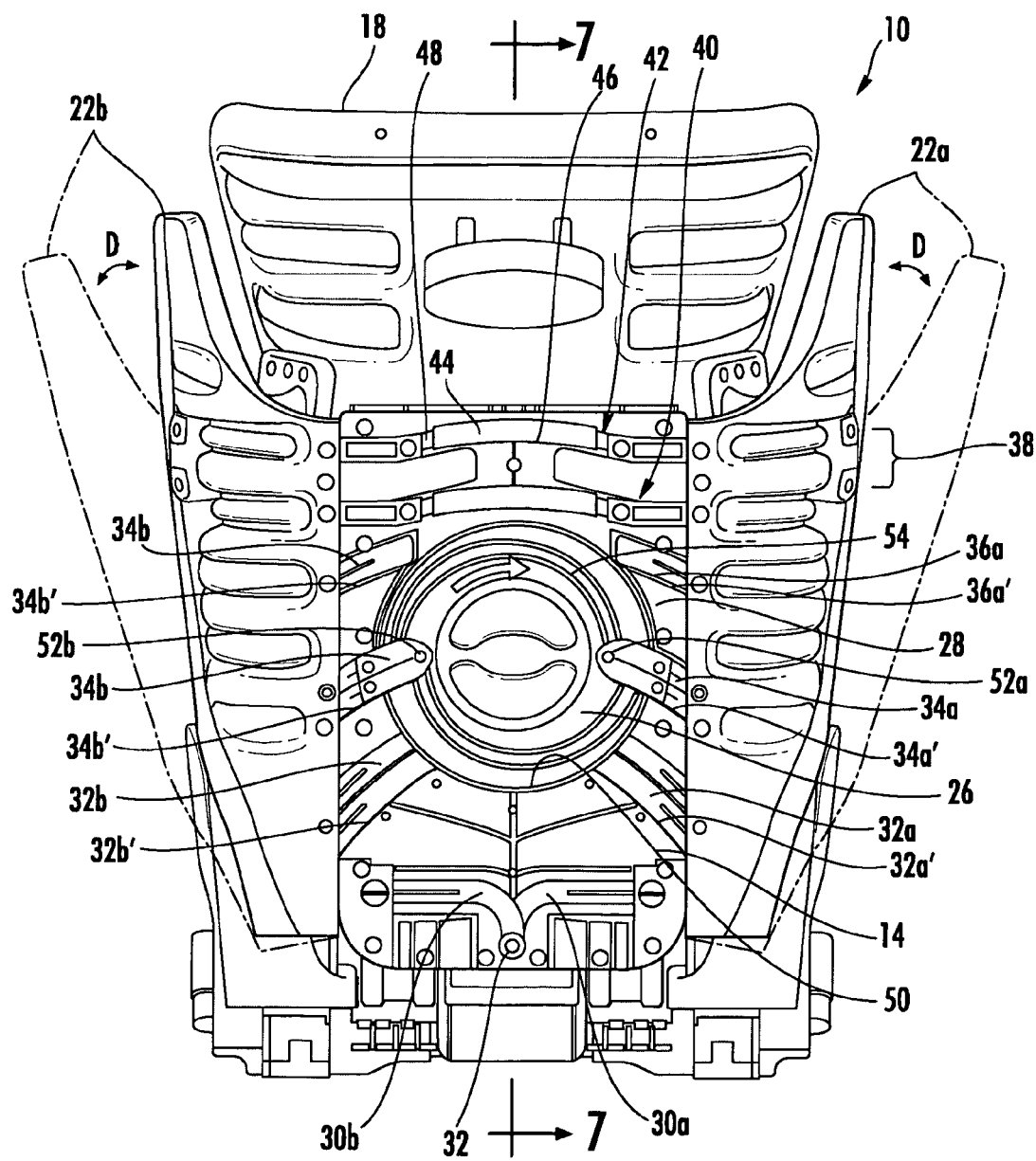
FIG. 4 is a rear elevational view of the adjustable child restraint device of FIG. 1 with the back panel removed for illustration purposes.

FIG. 4 illustrates a rear elevational view of the juvenile seat 10 of the present invention with the back plate 28 removed for illustration purposes. With the back plate 28 removed, the unique linkage arrangement can be easily seen.

Preferably, a pair of side guards 22a, 22b are employed, namely, a first side guard 22a and a second side guard 22b. As can be seen in FIGS. 1 and 2, each of the side guards 22a, 22b have a curved configuration to safely surround the child. This configuration is merely one example of the different type of configurations that may be used. Referring back to FIG. 4, on the opposing side each of the side guards 22a, 22b, respective mounting arms 30a, 30b are attached to each of the side guards 22a, 22b to pivotally secure them to the seat 10, such as to the seat back, at pivot point 32. More specifically, the mounting arms 30a, 30b are preferably pivotally attached to the same pivot point 32 for smooth and synchronized pivoting over a distance D, such as seen in FIGS. 2-4. It should be understood that while pivoting of both of the side guards 22a, 22b from the same pivot point 32 is preferred, it is possible that the side guards 22a, 22b may pivot about different pivot points. From this attachment method, the side guards 22a, 22b are pivotally attached to a pivot point 32 at the bottom of the seat 10 so that the distance B at the bottom of the seat 10 can be kept substantially fixed while the distance A at the top of the seat 10 can be made adjustable, as can be seen in FIG. 2.

With the side guards 22a, 22b pivotally attached at the bottom of the seat 10, there is a need to make the movement of the side guards 22a, 22b more stable, whether they are in a closed or open position or any position therebetween and also during movement thereof. Thus, a stabilization structure is needed for this purpose so that the side guards 22a, 22b can be better controlled. Referring to FIGS. 4-7, the structures used for such side guard control are shown in detail. Referring to FIG. 4, a number of stabilizing arms 32a, 32b, 34a, 34b, 36a, 36b are attached to both of the side guards 22a, 22b which interface with the seat back 14.

In particular, a curved guide structure, generally referred to as 38, is employed preferably at the top of the seat 10. For example, a pair of curved guides 40, 42 can be employed to adjustably interconnect the side guards 22a, 22b to the seat back 14. Both of the guides 40, 42 operate in the same fashion. For ease of discussion, operation of guide 42 only is discussed in detail.

Figure 7:
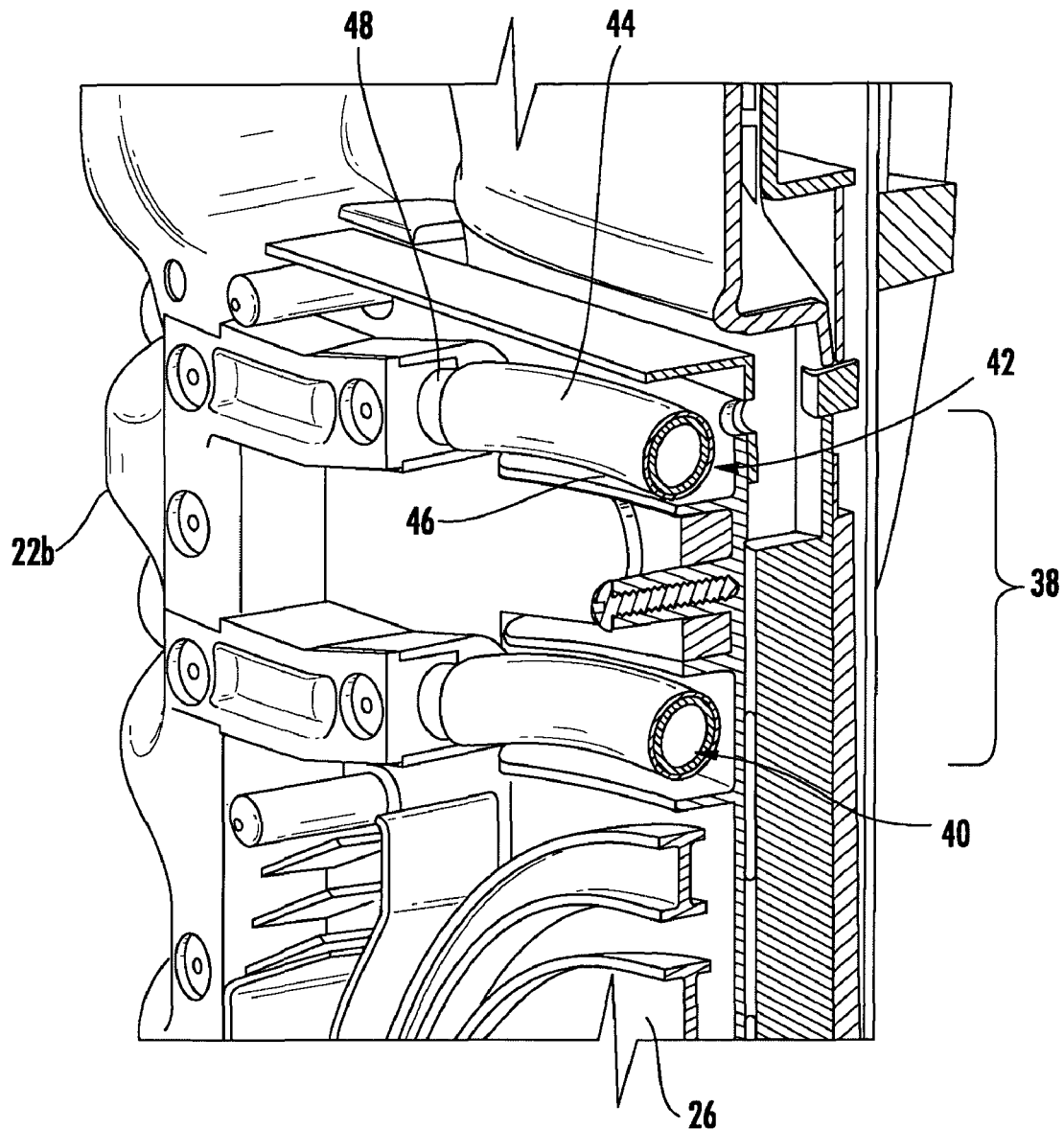
FIG. 7 is a close-up perspective cross-sectional view through the line 7-7 of FIG. 4.

Preferably, as shown in FIG. 7, a hollow tube 44, serving as a stabilizing arm, is secured to one of the side guards 22a, 22b and actuatable in a channel 46 defined in the seat back 14. Another stabilizing arm 48, such as in the form of a tube of smaller diameter than the first hollow tube is actuatably routed therein. With the back plate 28 in place, the stabilizing arms 32a, 32b, 34a, 34b, 36a, 36b and curved guide structure 38, attached to the side guards 22a, 22b, can freely slide therein. This preferred tube-in-tube configuration provides more stability because guiding contact is provided along every axis of potential errant movement thereby providing a more stable and smooth operation.

In FIG. 7, the tubular members 44, 48 are shown as circular in cross-section but they can be of any cross-sectional shape, such as oval, square or rectangular. Thus, the side guards 22a, 22b respectively attached thereto are further stabilized via the stabilizing arms routed through the channel in the seat back. One or more curved sets of members 44, 48 and channel 46 at the top may be used. As in the preferred embodiment of FIG. 4-7, two sets of members are employed for the curved guide structure 38 for this purpose.

To ensure stable adjustment of the side guards 22a, 22b, other curved stabilizing arms 32a, 32b, 34a, 34b, 36a, 36b are used to respectively slidably move within channels 32a', 32b', 34a', 34b', 36a', 36b' defined by the seat back 14.

It is preferred that the curved stabilizing arms 32a, 32b, 34a, 34b, 36a, 36b and the curved guide structure 38 (and members therein) have a radius along a path of a concentric circle defined about the pivot point 32 of the side guards 22a, 22b. This ensures smooth pivoting and control of the side guards 22a, 22b.

Figure 5:
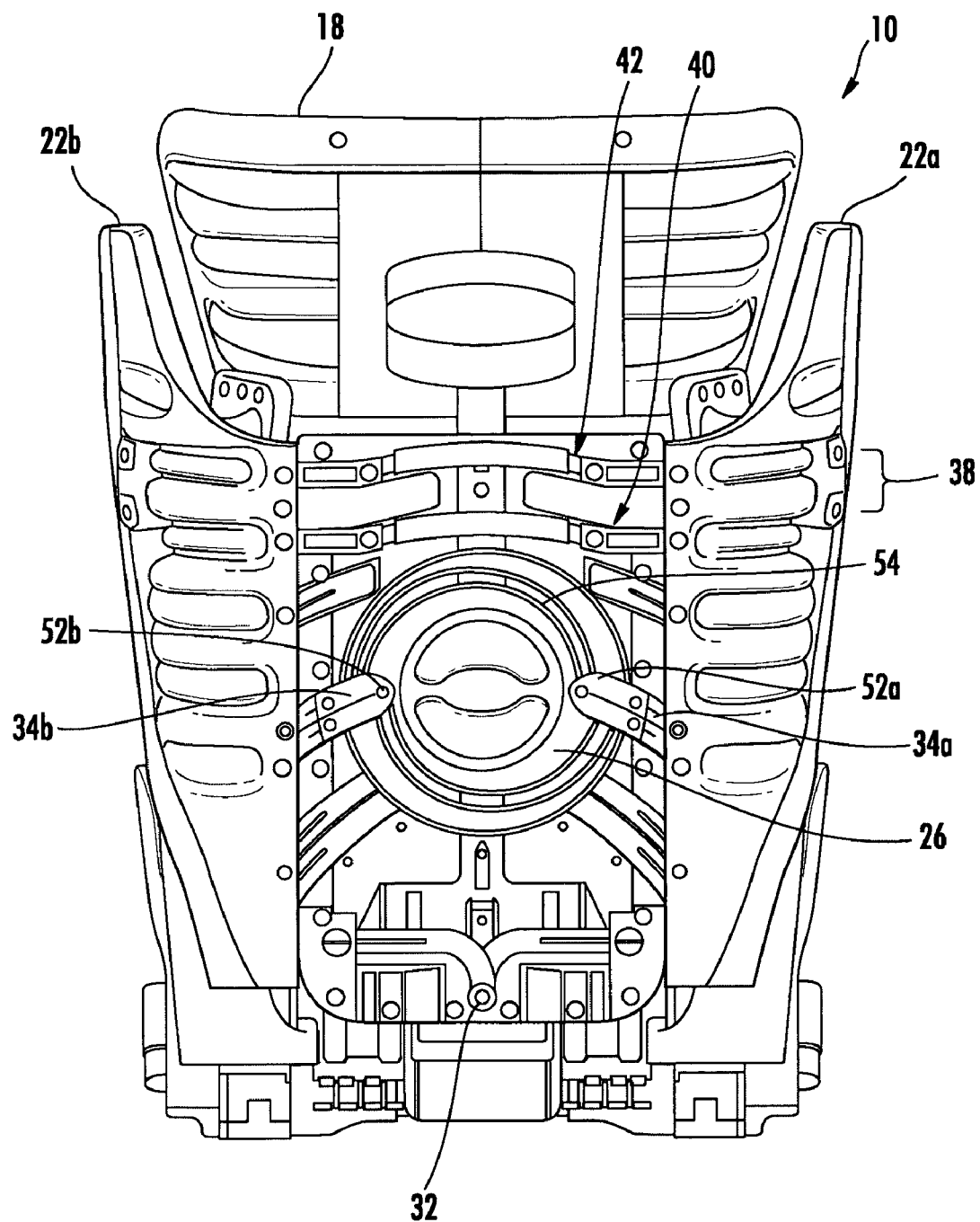
FIG. 5 is a rear elevational view of the adjustable child restraint device of FIG. 1 with the front and back panels removed for illustration purposes.
Figure 6:
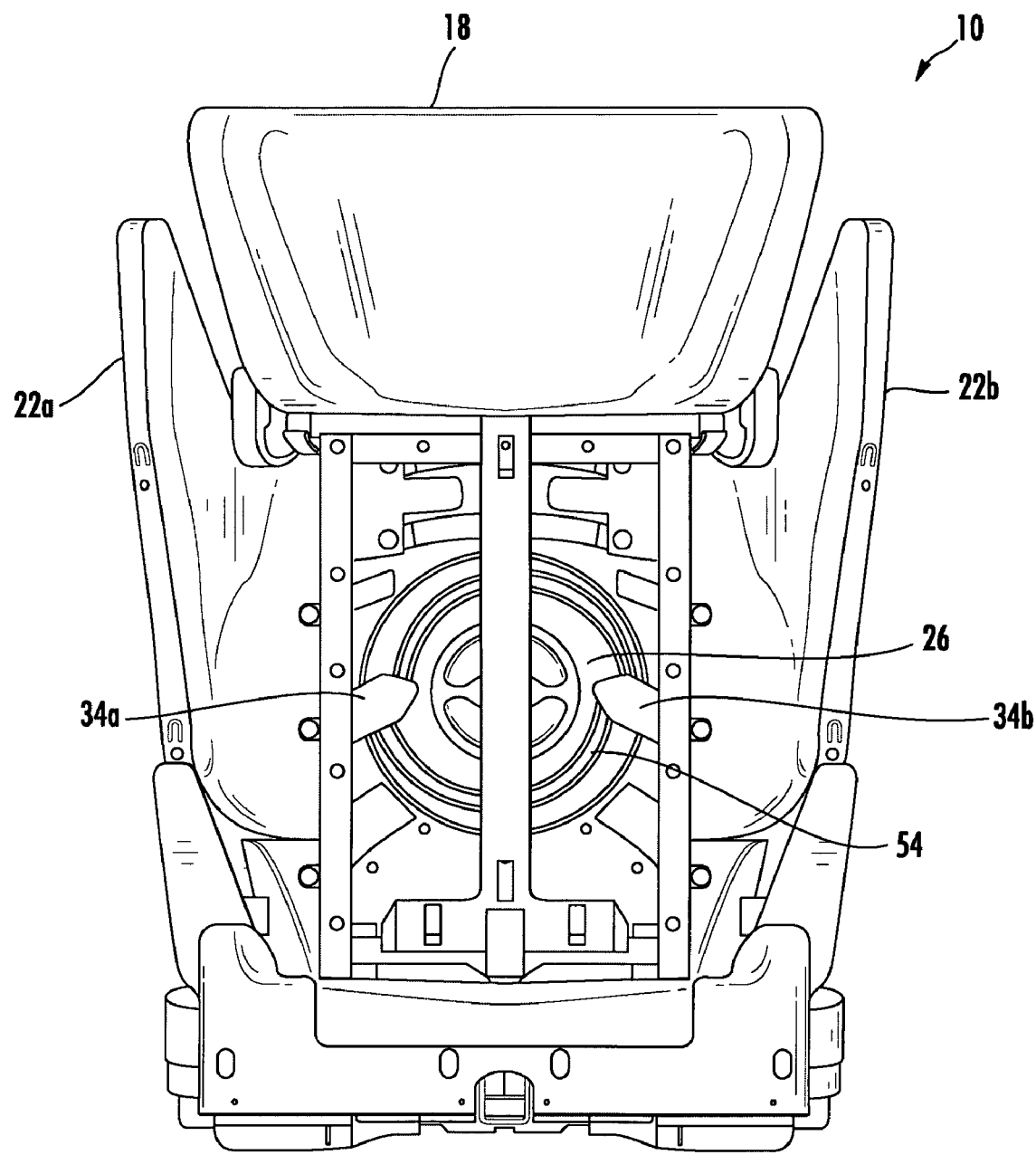
FIG. 6 is a front elevational view of the adjustable child restraint device of FIG. 1 with the front and back panels removed for illustration purposes.

As stated above, a control knob 26 is employed to effectuate adjustment of the side guards 22a, 22b. The control knob 26 is rotatably mounted to the seat back 14. Preferably, the control knob 26 is configured to have a round outer diameter to reside within a circular seat 50 in the seat back 14 to permit it to freely rotate therein. Attached to each of the side guards 22a, 22b is a central stabilizer arm 34a, 34b that also serves to control the adjustment of the side guards 22a, 22b. The free ends of the central stabilizer arms 34a, 34b have a pin 52a, 52b mounted thereon that resides in a cycloid-shaped pathway 54 that spirals outwardly. As the control knob 26 is rotated in a clockwise manner, the side guards 22a, 22b are adjusted outwardly because they are mechanically linked to the control knob 26 via the central stabilizer arms 34a, 34b and the pins 52a, 52b respectively attached thereto. Micro adjustment of the side guards 22a, 22b is possible by micro adjusting the control knob 26. FIG. 5 shows a rear view of the seat 10 with both the back panel 28 and the seat back 14 removed for illustration purposes and FIG. 6 shows a front view thereof to permit the linkage with cycloid pathway 54 between the side guards 22a, 22b and the control knob 26 to be clearly seen. Of course, the cycloid configuration of the control knob 26 can be reversed so counter-clockwise rotation thereof effectuates opening of the side guards 22a, 22b.

The result of rotation of the control knob 26 in a clockwise fashion, is shown in FIG. 8 where the side guards 22a, 22b are moved cause the distance A at the top of the seat 10 to be increased while the distance B at the bottom of the seat 10 remains essentially the same as distance B in FIG. 2 that shows the seat 10 in a closed condition.

FIG. 9 illustrates a rear view of the seat 10 with the back panel 28 removed to show the control knob 26 fully rotated clockwise to cause the pins 52a, 52b respectively attached to the central stabilizer arm to move outwardly as it tracks through the cycloid pathway 54. Thus, rotation of the control knob 26 smoothly urges the side guards 22a, 22b outwardly, which is possible using only one hand of the user. Partial rotation of the control knob 26 is possible between the condition shown in FIG. 4 with that shown in FIG. 9 to achieve the micro adjustment of the side guards 22a, 22b discussed above. As can be seen, throughout the adjustment process, each of the stabilizer arms 32a, 32b, 34a, 34b, 36a, 36b remain slidably received in their respective channels 32a', 32b', 34a', 34b', 36a', 36b' or tubes to maintain smooth and controlled operation of the side guards 22a, 22b. Also, support member 48 is actuated outwardly in tube 44 to further control movement of the side guards 22a, 22b.

Therefore, rotation of the control knob 26 alone positions the side guards 22a, 22b where desired to custom fit the seat 10 to the child sitting therein. The locking knob 26 can be secured in place to thereby lock the side guards 22a, 22b in place in many different ways. For example, the control knob 26 may be frictionally rotationally seated in the circular seat 50 in the seat back 14 so that the natural friction between the control knob 26 and the seat 50, in which it resides, prevents the side guards 22a, 22b from easily moving. This ensures that the side guards 22a, 22b remain where desired during use of the seat 10. It is also possible to use other locking mechanisms (not shown), such as a locking pin or other structure to prevent rotation of the control knob 26 and resultant movement of the side guards 22a, 22b.

An important part of the present invention is to provide a curved guide structure 38 to support and guide the pivoting movement of the side guards 22a, 22b. This curved guide structure 38 can be carried out in many different ways. For example, the preferred embodiment of the curved guide structure 38 is shown in FIGS. 4-7 where a pair of tubular members 44 are attached to one of the side guards and slidably actuates in a channel 46 or slot in the seat back 14. Members 48 of a smaller size are respectively attached to the other side guard to slidably actuate therein. Alternative embodiments for providing the curved guide structure at the top of the seat are shown in FIGS. 10-14. A pair of sets of members 44 and 48 are preferred to provide the curved guide structure 38 but only one set or more than two sets may be employed, as desired.

Figure 10:
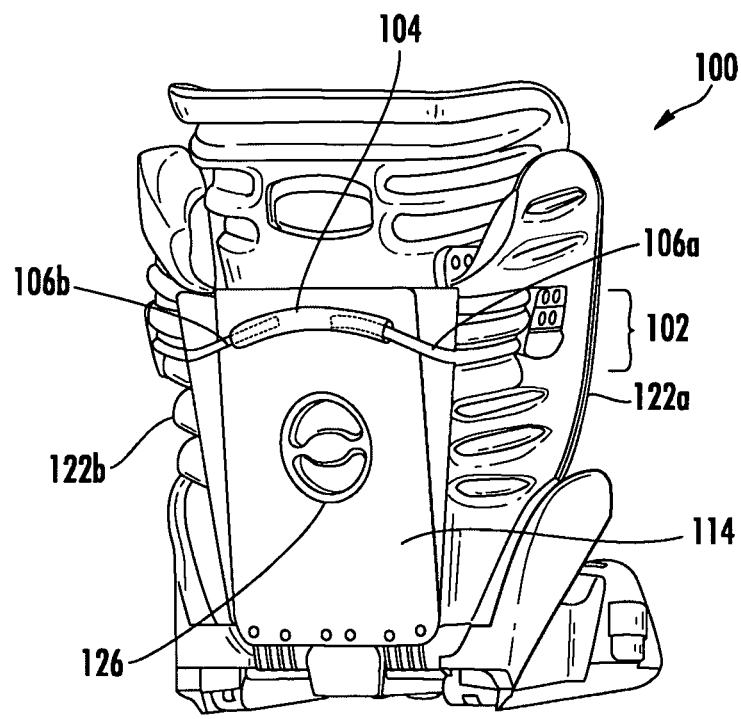
FIG. 10 is a rear perspective view of a first alternative embodiment of the adjustable child restraint device of the present invention.

FIG. 10 shows a first alternative embodiment 100 of the present invention having a curved guide structure 102 where a tubular member 104, having an inner diameter, is fixed to the seat back 114. Corresponding support members 106a, 106b having a smaller outside diameter or outside size, such as in the form of a tube or rod, are respectively fixed to the side guards 122a, 122b. As can be seen, the support members 106a, 106b slidably actuate in and out of the tubular member 104 fixed to the seat back 114 to provide a desired curved guide structure of the present invention. Of course, a curved rod (not shown) may be fixed to the seat back 114 while the support members are tubes (not shown) that slide over the fixed rod. More than one set of fixed tubular members and support members can be used for additional guiding function. Details of the control knob 126 and rotation thereof for movement is not shown in FIGS. 10-14 for east of illustration thereof.

Figure 11:
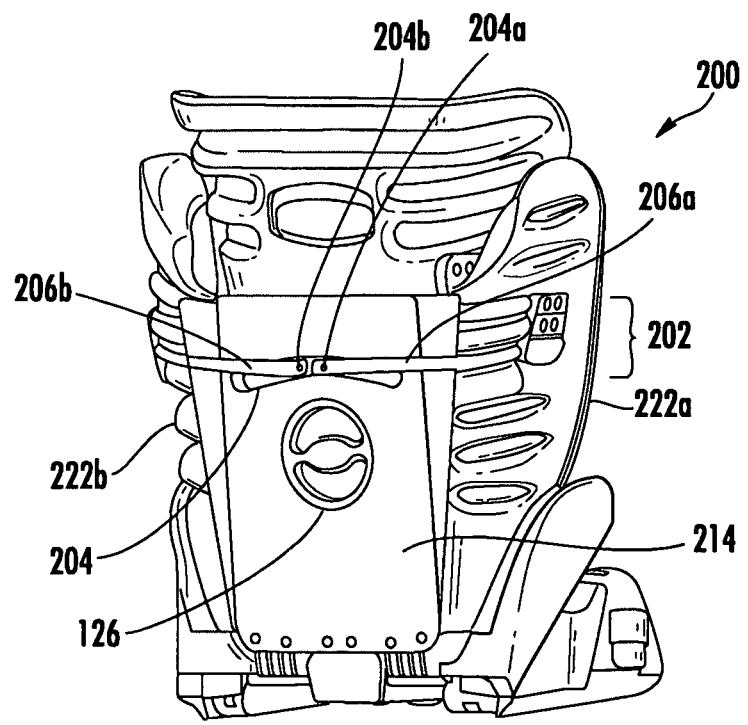
FIG. 11 is a rear perspective view of a second alternative embodiment of the adjustable child restraint device of the present invention.

FIG. 11 shows a second alternative embodiment 200 of the present invention that includes a further different type of curved guide structure 202. In this embodiment, a curved slot 204 is located in the seat back 214 to receive pins 204a, 204b respectively on the free ends of support members 206a, 206b respective fixed to the side guards 222a, 222b. Movement of the side guards 222a, 222b in and out are further controlled and guided by the curved guide 202 structure of FIG. 11.

Figure 12:
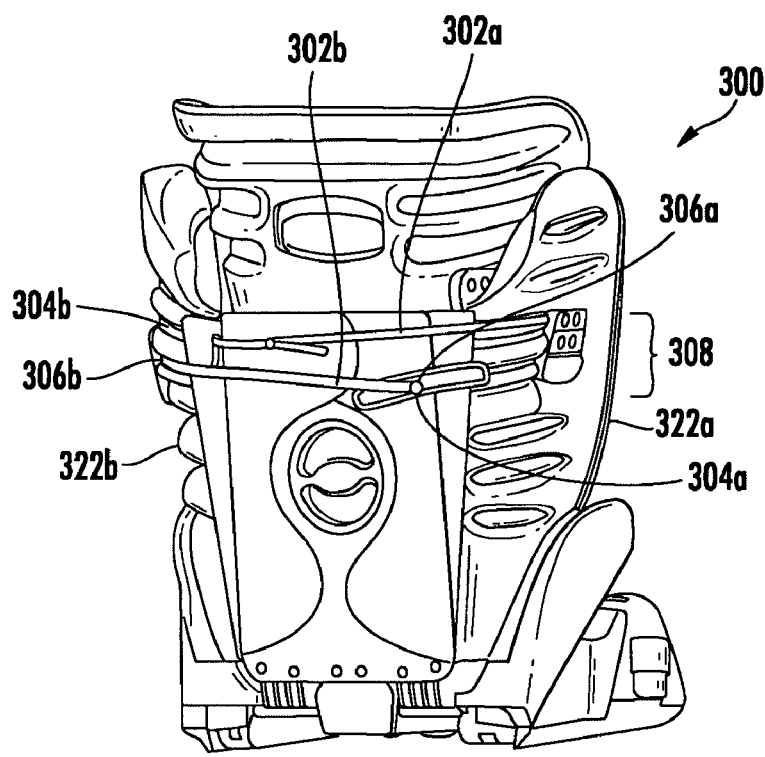
FIG. 12 is a rear perspective view of a third alternative embodiment of the adjustable child restraint device of the present invention.

Still further, FIG. 12 shows a further embodiment 300 where fixed support members 302a, 302b are respectively attached to the side guards 322a, 322b with pins 304a, 304b positioned on the free ends thereof. The pins 304a, 304b respectively slide within curved slots 306a, 306b in the opposing side guard. The size and position of the support members 302a, 302b and curved slots 306a, 306b are selected to provide the curved guide structure 308 of the present invention.

Figure 13:
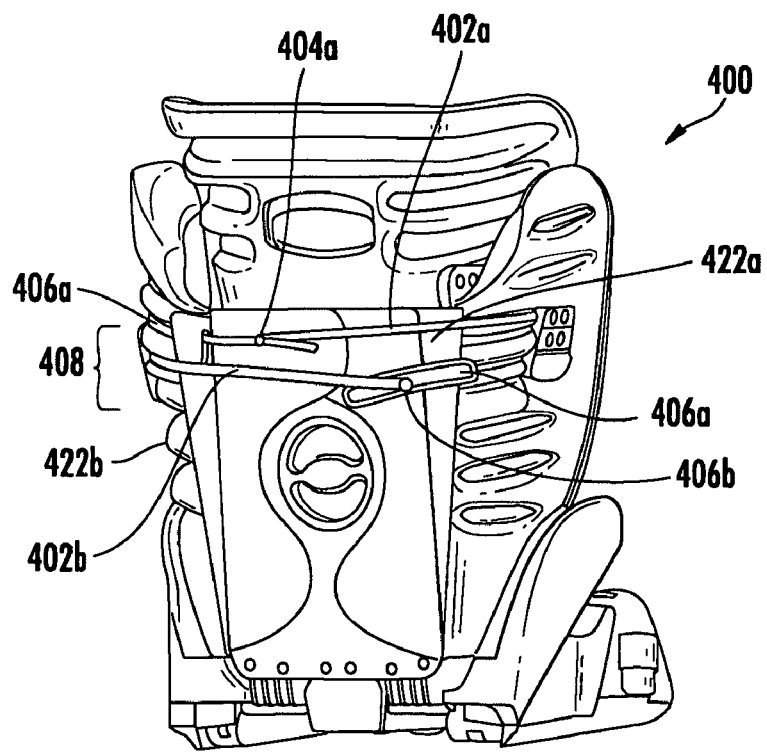
FIG. 13 is a rear perspective view of a fourth alternative embodiment of the adjustable child restraint device of the present invention.

FIG. 13 shows another embodiment 400 that includes a support member 402a affixed to one of the side guards 422a with a pin 404a on the free end thereof to slide within a curved slot 406a in the opposing side guard 422b. The opposing side guard 422b includes another support member 402b with a pin 406b thereon to slide within a curved slot 406b in side guard 422a. The combination of the sliding movement of the both of the support members 402a, 402b provides the required curved guide structure 408 of the present invention.

Figure 14:
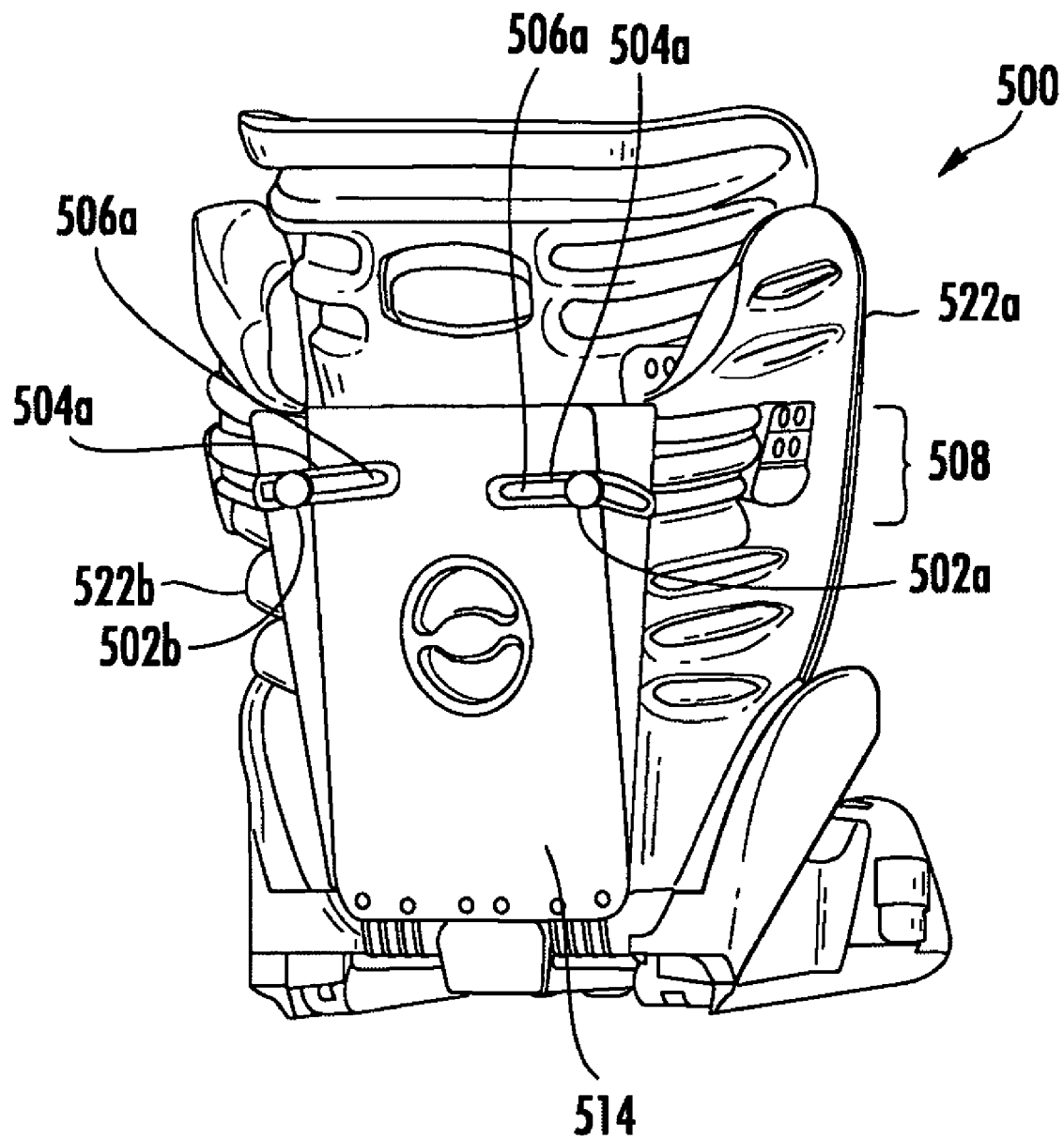
FIG. 14 is a rear perspective view of a first alternative embodiment of the adjustable child restraint device of the present invention.

FIG. 14 shows yet another embodiment 500 of the present invention that includes a pair of posts 502a, 502b attached the seat back 514. Support members 504a, 504b, having curved slots 506a, 506b respectively therein, are respectively attached to the side guards 522a, 522b. The fixed posts 502a, 502b respectively slide within the slots 506a, 506b of the curved support members 504a, 504b to provide the required curved guide structure 508 of the present invention.

The configuration of the different embodiments may be modified to best accommodate the particular configuration used. For example, the angles and curves shown in the attached figures may be changed to suit the configuration at hand.

In view of the foregoing, a new and novel adjustable restraint device is provided that is capable of being adjusted as the child grows to accommodate the child's different sizes. The device is easy to use and enhances the use and quality of the device and enables a single seat to be used over a long period of time.

It would be appreciated by those skilled in the art that various changes and modifications can be made to the illustrated embodiments without departing from the spirit of the present invention. All such modifications and changes are intended to be covered by the appended claims.

What is claimed is:

1. A juvenile safety seat, comprising:
   a backrest; and
   a pair of side guards for protecting the body and shoulder of a person; each of the pair of side guards having a top end and a bottom end; the bottom end of each of the side guards being located a bottom distance from each other and the top end of each of the side guards being located a top distance from each other; each of the pair of side guards being respectively pivotally connected about an axis to the backrest at their bottom ends and movable between a closed position and an open position so that the bottom distance between the respective bottom ends of the side guards remains substantially constant and the top distance between the respective top ends of the side guards is adjustable by pivoting movement of the side guards; the pair of side guards being pivotally connected about the same axis; and
   curved guide means, defining a curved travel pathway, in communication with the side guards for guiding movement of the side guards along the curved travel pathway.

2. The juvenile safety seat of claim 1, wherein the curved guide means is attached to at least one of the pair of side guards.

3. The juvenile safety seat of claim 2, wherein the curved guide means includes at least two members, which are both hollow and elongated, and of differing diameters from each other with one member being slidably received into another member.

4. The juvenile safety seat of claim 1, wherein the curved guide means is attached to the back rest.

5. The juvenile safety seat of claim 1, wherein the curved guide means includes at least one member, which is both hollow and elongated.

6. The juvenile safety seat of claim 1, wherein the curved guide means is a first member connected to a side guard and a second member, which is hollow and elongated, and connected to the other side guard; wherein the first member is respectively slidably received in the second member.

7. The juvenile safety seat of claim 1, wherein the curved guide means is at least one curved support member respectively connected to a side guard and respectively received in at least one curved channel in the backrest.

8. The juvenile safety seat of claim 1, wherein the curved guide means is at least one curved support member respectively connected to a side guard and respectively received in at least one curved channel in the other side guard.

9. The juvenile safety seat of claim 1, further comprising:
   a pair of support members respectively connected to the side guards;
   a plate rotatably connected to the backrest about an axis with an outer edge; the plate defining a pair of arcuate guides positioned about the axis; the arcuate guides each running from a position proximal to the axis to a position proximal to the outer edge of the plate; and
   the support members being configured to respectively reside in the arcuate guides whereby rotation of the plate causes the side guards to simultaneously pivot about their respective axes.

10. A juvenile safety seat of claim 9, wherein the plate is a cam rotatably connected to the backrest with the arcuate guides respectively defining two cycloid-shaped pathways therein with each of the side guards having a drive member respectively connected thereto; the drive members being respectively movably positioned within the cycloid-shaped pathways to configure the side guards for simultaneous operation and movement thereof.

11. The juvenile safety seat of claim 1, wherein the curved guide means and at least one of the side guards are respectively formed as a unitary structure.

12. The juvenile safety seat of claim 1, wherein the curved guide means and back rest are respectively formed as a unitary structure.

* * * * *